US009367287B2

(12) United States Patent
Dupont De Dinechin et al.

(10) Patent No.: US 9,367,287 B2
(45) Date of Patent: Jun. 14, 2016

(54) MIXED PRECISION FUSED MULTIPLY-ADD OPERATOR

(75) Inventors: Florent Dupont De Dinechin, Aix en Provence (FR); Nicolas Brunie, Grenoble (FR); Benoit Dupont De Dinechin, Grenoble (FR)

(73) Assignee: KALRAY, Orsay (FR)

(*) Notice: Subject to any disclaimer, the term of this patent is extended or adjusted under 35 U.S.C. 154(b) by 305 days.

(21) Appl. No.: 14/113,636

(22) PCT Filed: Apr. 19, 2012

(86) PCT No.: PCT/FR2012/050854
§ 371 (c)(1),
(2), (4) Date: Nov. 27, 2013

(87) PCT Pub. No.: WO2012/175828
PCT Pub. Date: Dec. 27, 2012

(65) Prior Publication Data
US 2014/0089371 A1 Mar. 27, 2014

(30) Foreign Application Priority Data
Apr. 28, 2011 (FR) ...................... 11 53649

(51) Int. Cl.
*G06F 7/38* (2006.01)
*G06F 7/487* (2006.01)
*G06F 7/483* (2006.01)
*G06F 7/544* (2006.01)

(52) U.S. Cl.
CPC .............. *G06F 7/4876* (2013.01); *G06F 7/483* (2013.01); *G06F 7/5443* (2013.01)

(58) Field of Classification Search
CPC ..................... G06F 7/4876; G06F 7/4837
USPC .......................................... 708/501
See application file for complete search history.

(56) References Cited

U.S. PATENT DOCUMENTS

| 5,268,855 A | * | 12/1993 | Mason | ............ G06F 7/483 708/204 |
| 5,880,984 A | * | 3/1999 | Burchfiel | ............ G06F 7/5443 708/497 |
| 8,880,573 B2 | * | 11/2014 | Erinjippurath | ........ G06F 7/38 708/204 |

OTHER PUBLICATIONS

Muller et al., Chapters 8.5 and 9.5, *Handbook of Floating Point Arithmetic*, pp. 254-262, 302-305.

(Continued)

*Primary Examiner* — Tan V. Mai
(74) *Attorney, Agent, or Firm* — Oliff PLC (57) ABSTRACT

A circuit for calculating the fused sum of an addend and product of two multiplication operands, the addend and multiplication operands being binary floating-point numbers represented in a standardized format as a mantissa and an exponent is provided. The multiplication operands are in a lower precision format than the addend, with q>2p, where p and q are the mantissa size of the multiplication operand and addend precision formats. The circuit includes a p-bit multiplier receiving the mantissas of the multiplication operands; a shift circuit aligning the mantissa of the addend with the product output by the multiplier based on the exponent values of the addend and multiplication operands; and an adder processing q-bit mantissas, receiving the aligned mantissa of the addend and the product, the input lines of the adder corresponding to the product being completed to the right by lines at 0 to form a q-bit mantissa.

5 Claims, 4 Drawing Sheets

(56) References Cited

OTHER PUBLICATIONS

Li et al., "Design of a Double-Precision Floating-Point Multiply-Add-Fused Unit with Consideration of Data Dependence," IEEE Computer Society Annual Symposium on VLSI(ISVLSI'07), Jan. 2007, pp. 492-497.

Quinnell et al., "Floating-Point Fused Multiply-Add Architectures," (Conference Record of the Forty-first Asilomar Conference on Signals, Systems & Computers, Nov. 7, 2007, Pacific Grove, California), pp. 331-337.

International Search Report issued in International Patent Application No. PCT/FR2012/050854 dated Nov. 22, 2012 (with translation).

Oct. 29, 2013 International Preliminary Report on Patentability issued in International Application No. PCT/FR2012/050854 (with translation).

\* cited by examiner

MIXED PRECISION FUSED MULTIPLY-ADD OPERATOR

FIELD OF THE INVENTION

The invention relates to a floating-point unit (FPU) of a processor, and more particularly to a fused multiply-add operator, more commonly referred to as FMA.

BACKGROUND OF THE INVENTION

An FMA operator takes three signed floating-point operands having the same precision format, two multiplicands A and B, and an addend C. It calculates the term AB+C to produce a result R in the same precision format as the operands. A specificity of such an operator is that it achieves a single rounding operation at the end of the calculation, which increases the precision by the fact that all the bits are preserved in the intermediate calculations. This operator is particularly useful when the product AB and the operand C have opposite signs but very close absolute values, producing a result in which significant bits fall out of the precision scope of the output of the circuit, but that can be recovered, by adjusting the exponent, from the results of intermediate calculations.

The operands A, B and C are in a floating-point format according to the IEEE-754 standard, comprising a sign bit S, an exponent E and a mantissa m. This standard defines several precision formats, including "binary32" with one sign bit, 8 exponent bits and 23+1 mantissa bits (one implicit bit being encoded in the exponent); "binary64" with an exponent of 11 bits and a mantissa of 52+1 bits; and "binary128" with a 15-bit exponent and a mantissa of 112+1 bits.

When possible, a floating-point number is represented as "normal", i.e. with a sign bit, a "1" before the decimal point, p−1 bits after the decimal point (where p is the size of the mantissa), and an exponent indicating the position of the decimal point with respect to the unit. The "1" before the decimal point is implicit and is not conveyed. It follows that p−1 bits define a p-bit mantissa for a normal number, the p-th bit being the implicit bit.

The exponent E is encoded with an unsigned number (0 to 255 for the binary32 format). For normal numbers, the real exponent e is obtained by subtracting a bias b: e=E−b. This bias is defined by the standard, e.g. b=127 for the binary32 format.

The normal numbers are identified by E>0. Thus the smallest normal number representable in binary32 format is $1.00 \ldots 0 \cdot 2^{-126}$.

When E=0, the number is called "subnormal". The real exponent is then e=1−b (which is the value of the smallest normal exponent), but the implicit bit of the mantissa is 0 instead of 1. For example, in the binary32 format, subnormal numbers are of the form $\pm 0.XX \ldots X \cdot 2^{-126}$. The value 0 is also represented in this manner.

Figure 1:
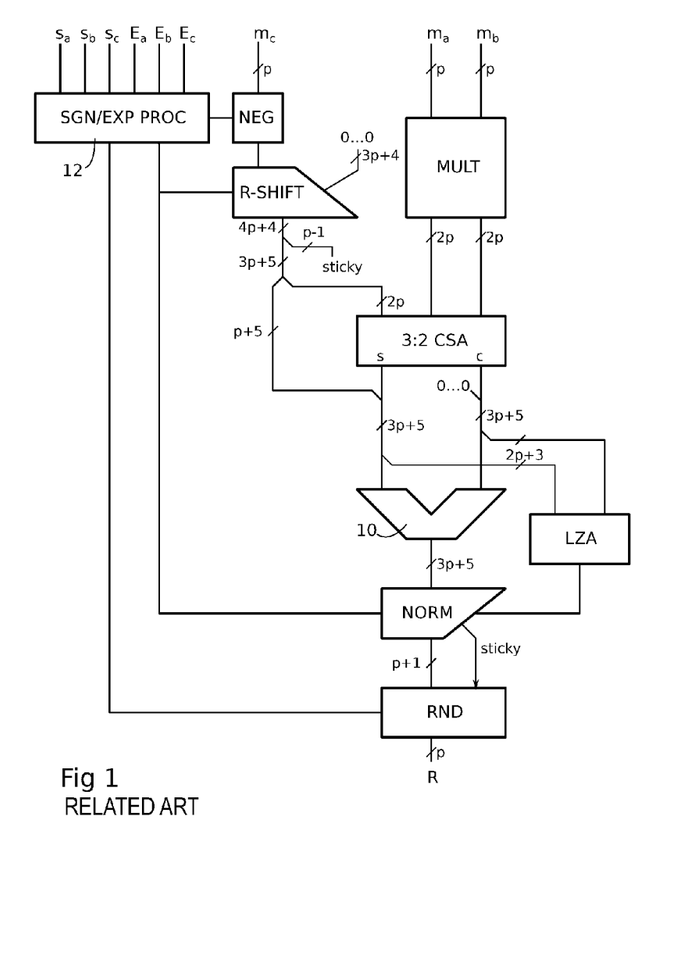
FIG. 1, described above, is a conventional architecture of an FMA operator.

FIG. 1 schematically shows a conventional FMA operator, as described in ["Handbook of Floating Point Arithmetic", Jean Michel Muller et al., Chaps. 8.5, 9.5]. The mantissas $m_a$ and $m_b$ of operands A and B, having p bits (including the bit before the decimal point), are provided to a multiplication tree MULT. This tree produces two 2p-bit outputs provided to two inputs of a carry-save adder CSA. A third input of the CSA adder receives 2p bits from a right-shift circuit R-SHIFT. The CSA adder produces the result as a partial sum s and a carry sequence c, on 2p and 2p+1 bits respectively. The outputs s and c of the adder are left-padded, respectively, by the p+5 most significant bits of the output of the R-SHIFT circuit, and p+4 zero bits, thereby forming two 3p+5-bit numbers applied to the two inputs of a full adder 10.

The R-SHIFT circuit receives as most significant bits the mantissa $m_c$ of the addend, right-padded with 3p+4 zero bits. The size of the shift circuit is thus 4p+4 bits. The p−1 least significant bits are not used further in the computations—a logical OR of all these bits forms a so-called "sticky bit" that condenses their useful information: whether they are all zero or not. The remaining 3p+5 bits can all be used in computations: the 2p least significant bits are supplied to the CSA adder, and the remaining p+5 most significant bits are provided to the full adder 10.

The signs s and the exponents e of the operands are provided to a processing circuit 12 that produces the shift amount for the R-SHIFT circuit, here equal to $e_a+e_b-e_c+p+4$. According to the sign information, the circuit 12 negates the mantissa $m_c$ through a circuit NEG placed upstream the R-SHIFT circuit.

The output of the adder 10, also on 3p+5 bits, is provided to a normalization circuit NORM. Normalization essentially consists in performing a left-shift of the result, to bring the first significant "1" to the front of the number (as required by the standard), and readjusting the exponent accordingly. The exponent and left-shift amount are determined by the terms $e_a+e_b$ or $e_c$ transmitted by the circuit 12, and depend on the alignment position of the mantissa with respect to the product $m_a m_b$. A leading zero anticipation circuit LZA provides additional information for the operation. The LZA circuit estimates, from the 2p+3 least significant bits of each of the inputs of the adder 10, the number of leading zeros at the output of the adder. This number of leading zeros corresponds to a further left-shift to be applied, and to a compensation to apply to the exponent.

The estimate made by the LZA circuit is accurate to one bit, depending on whether the addition propagates a carry or not on the most significant bit. To remove this uncertainty, a further normalization step is achieved, but it is very fast, because it is performed on only one bit. This procedure is used, because the estimation of the number of leading zeros in the shown configuration may thus be done in parallel with the calculation of the adder 10, and does not introduce additional latency in the production of the final result.

The circuit NORM provides a result on p+1 bits to a rounding circuit RND that produces the final result R rounded to p bits. The non-zero bits remaining behind the p+1 bits are condensed with the sticky bit from the R-SHIFT circuit. This sticky bit participates in the calculation of the rounding with the least significant bit of the output of the normalization circuit.

The circuit RND also determines whether the sign of the result should be reversed, according to information produced by the processing circuit 12 and the sign of the result of the adder (in cases where the sign is not predictable prima facie, for example in AB+C where AB is positive and C negative). In the shown configuration, in calculating for example AB−C (where A, B and C are all positive), the circuit NEG reverses the sign of the mantissa $m_c$, and the sign of the result is not changed. On the other hand, in calculating C−AB, the sign of mantissa $m_c$ is again reversed, and the sign of the result R is also reversed (i.e. −(AB−C) is calculated).

Figure 2:
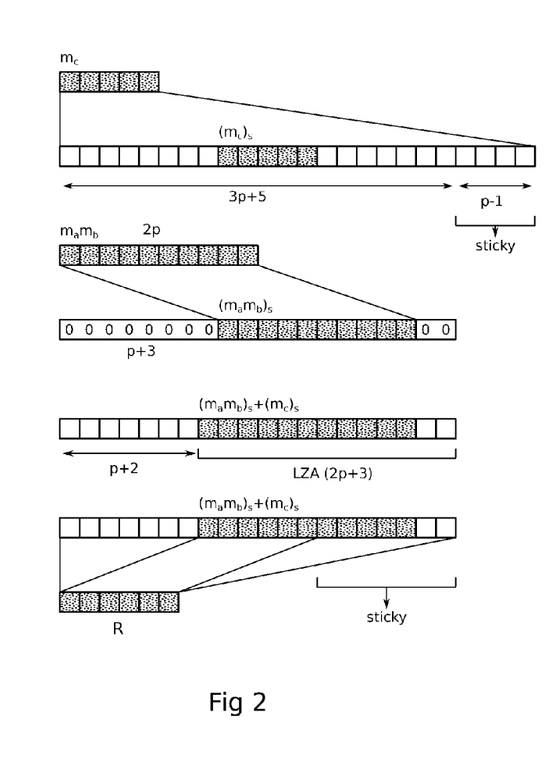
FIG. 2, described above, schematically shows intermediate numbers produced in the architecture of FIG. 1.

FIG. 2 illustrates the operation of the circuit of FIG. 1 at various stages of the flow of the processed numbers. The shaded areas represent the case where AB and C are close ($e_a+e_b-e_c=0$). The dimensions correspond to p=5. This figure was adapted from the manual mentioned above.

In the upper part, the mantissa $m_c$ is introduced into the R-SHIFT circuit. Its shifted version $(m_c)_s$ is dynamically positioned in a range of 4p+4 bits according to the exponents. The shaded areas indicate the position corresponding to $e_a+e_b-e_c=0$. The most significant bit of the shifted mantissa $(m_c)_s$ is aligned with the most significant bit of the shifted product $(m_a m_b)_s$. The product $(m_a m_b)_s$ is actually statically shifted by hard-wiring the corresponding input of the adder 10, so that the mantissa $(m_c)_s$ may, through the R-SHIFT circuit, be shifted at the other input of the adder 10 between a position fully to the left of the product $(m_a m_b)_s$ and a position fully to the right. A number of additional bits are provided in the shift range, here four, including three to the left and one to the right of the product, in particular to take account of carry propagations, rounding bits, and uncertainty about the position of the decimal point (e.g. the product of the mantissas of two normal numbers has two bits before the decimal point, where the most significant bit may be zero).

A fifth row shows the output of the adder 10. The sum $(m_a m_b)_s+(m_c)_s$, shown in gray, because it can produce a carry-out, occupies one more bit to the left. Leading zero anticipation (LZA) is performed on the set of potential bits forming the sum up to the right-most bit of the input of the adder 10.

The lower part of the figure corresponds to the normalization operation. The output R before rounding is taken on the p+1 most significant bits of the sum $(m_a m_b)_s+(m_c)_s$.

All operands of an FMA operator use the same format. If a high precision of the result is needed, the FMA operator will be chosen to use the binary64 format, or even the binary128 format, rather than the binary32 format.

In many applications, it is desirable to have an intermediate precision for the calculations, greater than the precision of the inputs. This overcomes issues with the accumulation of rounding errors. For example, it is common to have to calculate the sum of a series of products, which is achieved by multiply-accumulate iterations. In this case, it is desirable to calculate the accumulation in a higher precision format than the input format. For example, for binary32 inputs, the accumulation would be calculated in the binary64 format.

In such an application, the FMA operator is sized to handle operands having the maximum desired precision, binary64 or even binary128. The binary32 operands are then converted to the binary64 format, for instance, before they are applied to the FMA operator. Program instructions exist for such a conversion in software. The conversion is not trivial: it consists in mapping a 24-bit mantissa on a 53-bit mantissa, mapping an 8-bit exponent on an 11-bit exponent using a different bias, and converting subnormal numbers of binary32 format to normal numbers of binary64 format, since all subnormal numbers of binary32 format can be represented as normal in binary64 format.

As a result, the FMA operator is underutilized for the multiplication operands, and its use is made more complex for the format conversion needs.

SUMMARY OF THE INVENTION

There is therefore a need for an FMA operator accepting mixed precision operands and whose complexity is less than that of an FMA sized for the higher precision operands.

This need is addressed by a method of fused calculation of the sum of an addend and a product of two multiplication operands, the addend and multiplication operands being binary floating-point numbers represented in a standardized format as a mantissa and an exponent. The open multiplication operands are in a lower precision format than the addend, with q>2p, where p is the mantissa size of the multiplication operands precision format and q is the mantissa size of the addend precision format. The method comprises the steps of:
  multiplying the mantissas of the multiplication operands using a p-bit multiplier;
  right-padding the 2p-bit product resulting from the multiplication with zeros to form a q-bit product mantissa;
  aligning the mantissa of the addend and the mantissa of the product based on the exponent values of the addend and multiplication operands; and
  adding the aligned mantissas of the product and the addend.

According to an embodiment, the method comprises the steps of
  left-shifting the addend mantissa and the product based on the number of leading zeros in the multiplicand mantissas; and
  decreasing the exponent of the final result by the left-shift amount.

A circuit is also provided for calculating the fused sum of an addend and a product of two multiplication operands, the addend and multiplication operands being binary floating-point numbers represented in a standardized format as a mantissa and an exponent. The multiplication operands are in a lower precision format than the addend, with q>2p, where p is the mantissa size of the multiplication operands precision format and q is the mantissa size of the addend precision format. The circuit comprises a p-bit multiplier receiving the mantissas of the multiplication operands; a shift circuit configured to align the mantissa of the addend with the product output by the multiplier based on the exponent values of the addend and multiplication operands; and an adder configured for processing q-bit mantissas, receiving the aligned mantissa of the addend and the product, the input lines of the adder corresponding to the product being completed to the right by lines at 0 to form a q-bit mantissa.

According to an embodiment, the circuit comprises a zero counter circuit providing the sum of the number of leading zeros of the mantissas of the multiplication operands; a left-shift circuit connected to act on the output of the multiplier, receiving the output of the zero counter circuit as the shift amount; and a right-shift circuit connected to act on the mantissa of the addend, receiving as a shift amount a function of the exponents of the addend and multiplication operands, less the output of the zero counter circuit.

According to an embodiment, the size of the inputs of the adder is 2q bits, plus a few bits for accommodating carry propagation and rounding bits.

BRIEF DESCRIPTION OF THE DRAWINGS

Other advantages and features will become more clearly apparent from the following description of particular embodiments of the invention provided for exemplary purposes only and represented in the appended drawings, in which.

DETAILED DESCRIPTION OF EMBODIMENTS

To meet the needs of many floating-point applications, for example multiply-accumulate, a mixed precision FMA operator is disclosed herein whose complexity is reduced compared to a conventional FMA operator meeting the required precision. The format of the result R produced by the operator and the format of the addend C meet the desired maximum precision, say binary64 or even binary128, while the multiplication operands A and B are in a lower precision format, say binary32.

At some point in the structure of the operator, a transition is performed from the lower precision numbers to the higher precision format of the result. The choice was made herein to make this transition at the output of the multiplier calculating the product of the mantissas of the multiplication operands. The resulting product is in the form of a number having twice the size of the mantissas, which turns out to be compatible, to a few bits, with the size of the mantissa of the next higher precision format. For example, the product of two mantissas of binary32 format is a 48-bit number that can fit as the most significant bits of the 53-bit mantissa of the binary64 format, the five missing bits to the right being padded with zeros. This may be achieved without disrupting the calculations taking place in parallel on the exponents.

The exponents of the multiplication operands are converted to the higher precision format from the input of the operator. Such a conversion, involving integers, is simple. For example, an exponent of binary32 format (8 bits with a bias of 127) is adapted to binary64 format (11 bits with a bias of 1023) by fitting the 8 bits to the right in the 11 bits and adding 1023-127. This conversion may even be avoided, for example by merging the biases when calculating the normalization shift amount. For a conventional FMA operator, the following would be calculated:

$$E_c-(E_a+E_b)+(-\text{bias}+2\text{bias})+\text{sub}=E_c-(E_a+E_b)+\text{bias}+\text{sub},$$

where sub is a correction coefficient depending on the operands being normal or subnormal. This finally amounts to adding the exponents or their opposites with a constant. With a mixed precision FMA operator as disclosed herein, it is sufficient to modify this constant without actually correcting the exponents.

Preferably, the multiplier is configured to process mantissas of the lower precision format. For example a 24×24 multiplier may be used instead of a 53×53 multiplier, which has a significant impact on the complexity and latency of the FMA operator.

In proceeding this way, it can be noted that the product, considered in the higher precision format of the final result, is always representable as a normal number, and this even when both multiplication operands are subnormal. However, the product may contain up to 2p−1 most significant bits at zero.

In a conventional FMA operator, if both multiplication operands are subnormal, the product is too close to zero to be representable in the format of the final result. The product can therefore be condensed into a sticky bit, bearing in mind that the result of the FMA operator is then the addend, or one of the two numbers framing it when the sticky bit is non-zero and that a directed rounding is operated. Thus, the product actually participates in the addition when only one of the multiplication operands is subnormal. This corresponds to the only case where the product has up to p−1 significant bits at zero (in the representation of FIG. 1). It is then known that the shifted mantissa of the addend cannot be placed further to the right of the product. This allows for simplifications in the conventional FMA operator, including reducing the number of bits to consider to the right of the product, so reducing the size of the inputs of the adder 10.

These simplifications are not adaptable to a mixed precision FMA operator as considered here, because a product having zero bits on the left can still be normalized, meaning that the shifted version of the mantissa $m_c$ can be located to the right of the product and have bits participating in the final result. An embodiment is however provided that benefits from comparable simplifications.

Figure 3:
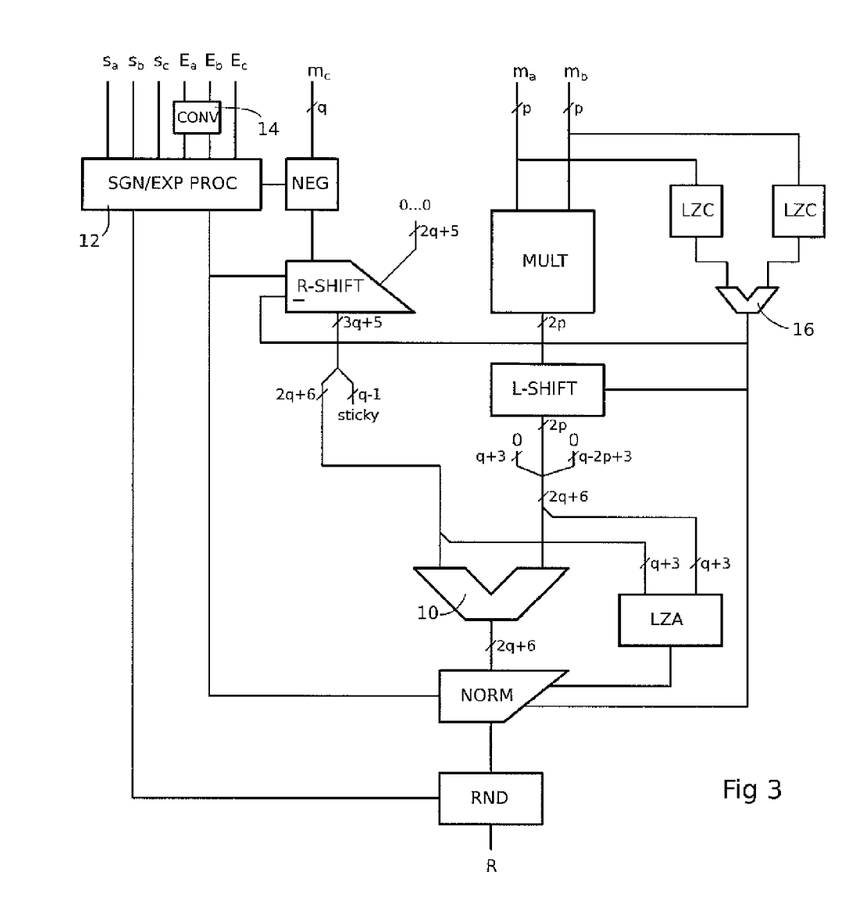
FIG. 3 shows a first embodiment of an architecture of a mixed precision FMA operator.

FIG. 3 shows a first embodiment of an architecture of a mixed precision FMA operator. Similar elements to those of FIG. 1 are designated by same references or acronyms, and their operation will not be described again—rather, the differences with the architecture of FIG. 1 will be described.

The mantissas $m_a$, $m_b$ of the have a size of p bits, while the mantissa $m_c$ of the addend has a size of q bits. Using the binary32 and binary64 formats yields p=24 and q=53. In general q>2p.

The exponents $E_a$ and $E_b$ of the multiplication operands are converted into the higher precision format by a circuit 14 whose function, mentioned above, is to take into account the bias.

The p×p-bit multiplier MULT, receiving mantissas $m_a$ and $m_b$, is shown as producing a single 2p-bit output.

The R-SHIFT circuit has a size of 3q+5 bits, which is smaller than the 4q+4 bits of the shift circuit of a conventional binary64 FMA operator. The 2q+6 most significant bits of the shift circuit are provided to a first input of adder 10. The q−1 least significant bits are condensed in a sticky bit. It will be understood later how to determine these numbers of bits.

The output of the multiplier is supplied to a 2p-bit left-shift circuit L-SHIFT. The 2p bits of the output of the L-SHIFT circuit are right-padded with q−2p+3 zeros and left-padded with q+3 zeros to form a 2q+6-bit number supplied to the second input of adder 10. Among the right-padded zeros, the q−2p zeros correspond to those required to transform the product result into a mantissa conforming to the higher precision format (q−2p=5 in the example of the binary32 and binary64 formats). The adder 10 is thus sized for summing 2q+6-bit numbers whereas the counterpart adder in a conventional binary64 FMA operator would be sized for 3q+5 bits. This economy as to the number of bits of the adder significantly reduces the latency.

The leading zero anticipation circuit LZA, used for the normalization circuit NORM, analyzes the q+3 least significant bits of each input of the adder 10.

A circuit for pre-normalizing the output of the multiplier MULT, including the shifter L-SHIFT, allows the reduction of the number of bits of the adder 10. This pre-normalization circuit additionally comprises two leading zero counters LZC respectively analyzing the mantissas $m_a$ and $m_b$ of the multiplication operands. The outputs of counters LZC are summed in 16 to provide a left-shift amount to the L-SHIFT circuit. This same amount is subtracted from the setting of the R-SHIFT circuit to preserve the alignments on the two inputs of the adder 10. The left-shift amount is finally supplied to the normalization circuit NORM for subtracting it from the exponent of the final result.

A role of the pre-normalization circuit is to normalize the multiplication result when at least one of the multiplication operands (in the lower precision format) is subnormal. Such an operation is useful here, because, as previously mentioned, the product is always representable in normal form in the format of the result, even if the two multiplication operands are subnormal.

Figure 4:
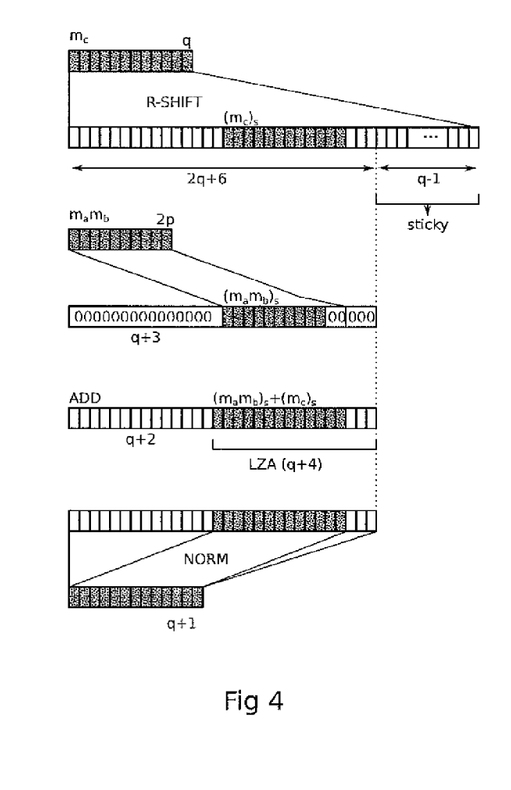
FIG. 4 shows intermediate numbers produced in the architecture of FIG. 3.

FIG. 4 shows, in the same format as in FIG. 2, the operation of the circuit of FIG. 3 at various processing stages of the numbers. The dimensions correspond to p=5 and q=12. Shaded areas represent exemplary positions of the intermediate results in the case where $e_a+e_b-e_c=0$, and where no left-shifting is needed (the multiplication operands are normal). This drawing may be read like FIG. 2. Note that the shifted product $(m_a m_b)_s$, of 2p (10) bits, is right-padded by q−2p (2) zero bits to form a q-bit mantissa, used for the addition performed in the next stage.

Figure 5:
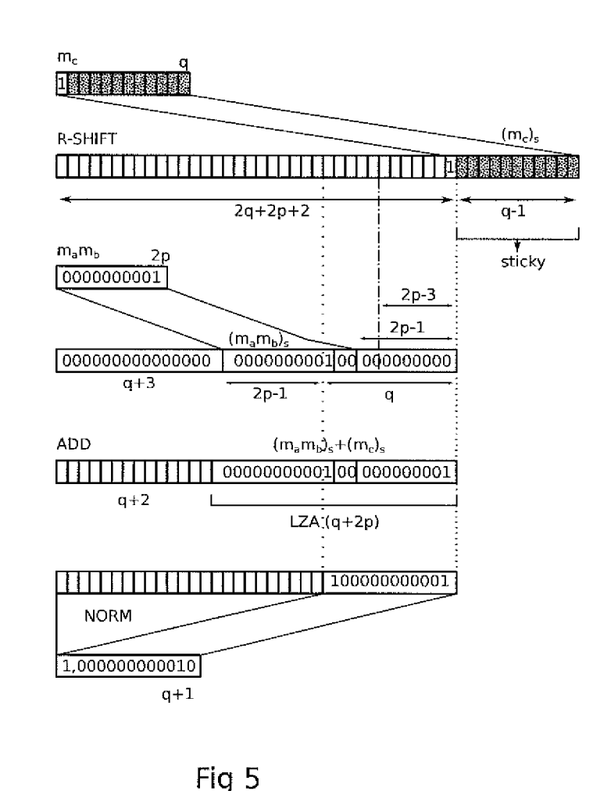
FIG. 5 shows intermediate numbers produced in an architecture lacking a "pre-normalization" function, where the multiplication operands are subnormal.

FIG. 5 illustrates, in the same representation as in FIG. 4, a limit situation revealing the size of the inputs of the adder 10 that would be required if no pre-normalization circuit was used.

It is assumed that the addend is normal, that is to say, the most significant bit of the mantissa $m_c$ is 1. The multiplication operands are the smallest sub-normal numbers of their format, that is to say that only their LSB is at 1. In addition, the exponents are such that the most significant bit of the shifted mantissa $(m_c)_s$ is placed q−1 bits to the right of the shifted product $(m_a m_b)_s$. In other words, the sum produces a q-bit number whose MSB, at 1, is at the position of the LSB of the shifted product $(m_a m_b)_s$, and whose LSB, at 1, is at the position of the MSB of the shifted mantissa $(m_c)_s$.

This situation does not occur in a conventional FMA operator. To process it, a first solution may be to provide 2p−3 additional lines to the right of the 2q+5-line buses supplying the inputs of the adder 10 in FIG. 3. These 2p−3 lines are supplied by the R-SHIFT circuit at the first input of the adder, and forced to 0 at the second input. This brings the size of the adder to 2q+2p+2 bits, comparable to the size 3q+5 of its counterpart in a conventional binary64 FMA operator.

The leading zero anticipation (LZA) is performed on q+2p bits.

A preferable solution is to use the pre-normalization circuit provided in FIG. 3, saving the 2p−3 lines above.

Figure 6:
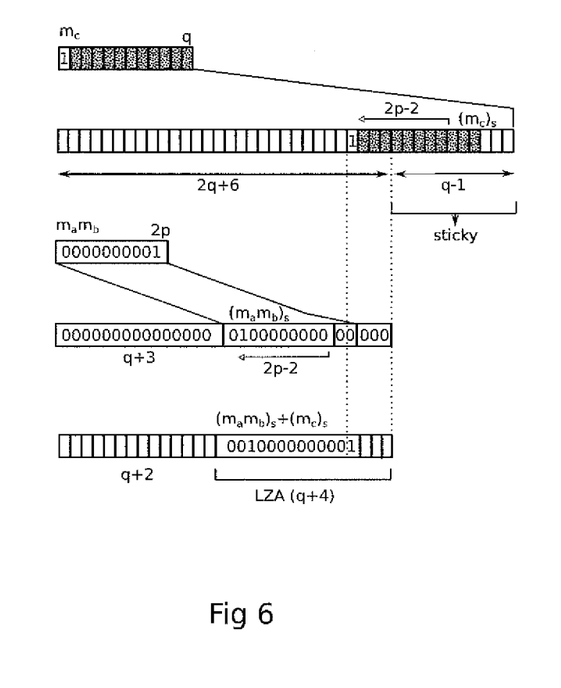
FIG. 6 shows intermediate numbers in the same situation as in FIG. 5, but in the architecture of FIG. 3.

FIG. 6 illustrates the operation of the pre-normalization circuit in the same situation as in FIG. 5. The dimensions shown are those that have been mentioned in connection with FIG. 3. The left-shift amount calculated in this situation is 2p−2 bits, originating from p−1 (4) leading zeros in each of the mantissas $m_a$ and $m_b$. It appears that with this shift amount, represented by arrows "2p−2", the MSB of the mantissa $(m_c)_s$ is aligned with one of the lines supplying the adder, while, had there been no shift, it would have contributed to the sticky bit. The LSB at 1 of product $(m_a m_b)_s$, shifted by the same amount, maintains its alignment with the mantissa $(m_c)_s$.

Note that the left-shift does not need to be accurate to the unit. The left shift could have had one bit more, bringing the 1 of product $(m_a m_b)_s$ in the left-most position, or one bit less, still bringing the MSB of the mantissa $(m_c)_s$ on an input line of the adder.

The leading zero anticipation (LZA) is performed on q+4 bits.

Figure 7:
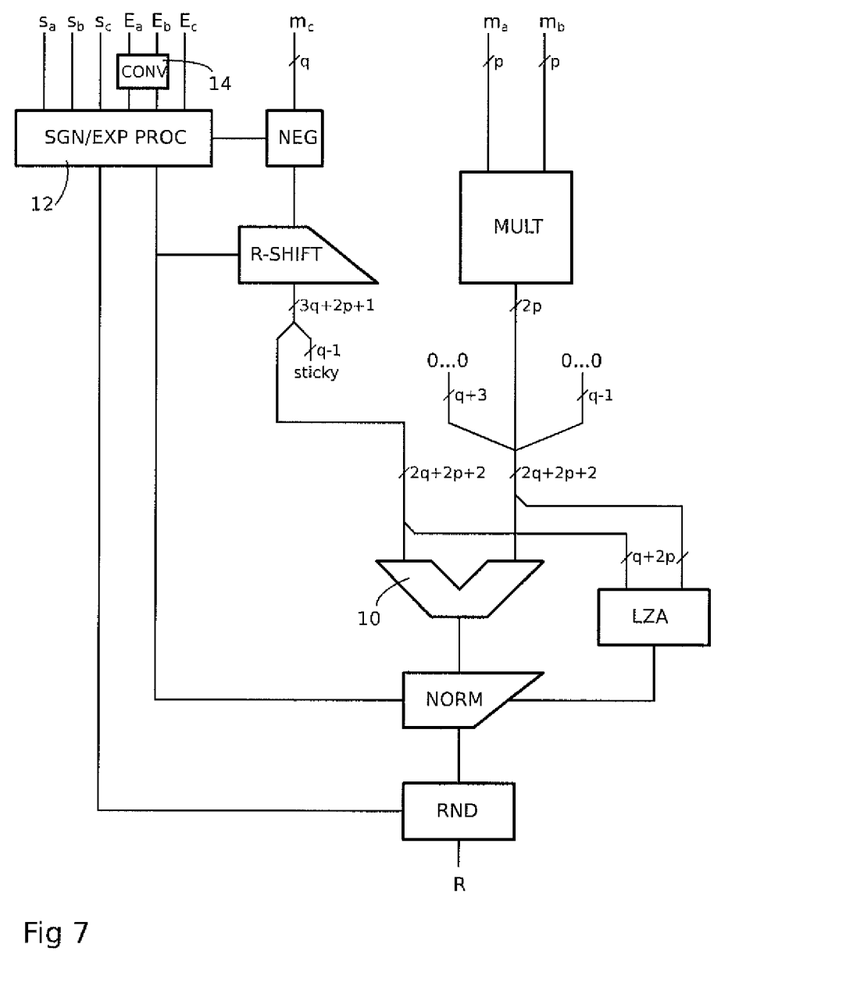
FIG. 7 shows a second embodiment of an architecture of a mixed precision FMA operator, functioning according to the diagram of FIG. 5.

FIG. 7 shows an embodiment of a mixed precision FMA operator architecture consistent with the structure and operation described in connection with FIG. 5, that is to say, without a pre-normalization circuit. Its components have been described in relation with the previous figures, and will not be described again.

As mentioned above, this embodiment uses an adder of comparable size to that of a conventional FMA operator providing a result of same precision. However, it still has the advantage, like the embodiment of FIG. 3, of using a lower precision multiplier that is faster and occupies less surface area.

Compared to the embodiment of FIG. 3, this embodiment does not introduce latency in the output of the multiplier, latency due to the L-SHIFT circuit. However, this advantage may be mitigated by the fact that the adder is larger, and therefore slower, than that of the embodiment of FIG. 3.

A significant advantage of the mixed precision FMA operators of the type described herein is that their operands can be provided over a data bus having a substantially smaller size than that required in a conventional FMA operator for a result of same precision. For example, a mixed binary32/binary64 operator requires 128 data bits (2×32+64), whereas a conventional FMA binary64 operator requires 192 bits. The decrease in the size of the bus is accompanied by a decrease in power consumption.

Many variations and modifications of the embodiments described herein will be apparent to the skilled person. The described structures operate a so-called "product-anchored" alignment, that is to say that the product has a fixed offset while the addend is shifted dynamically around the product. Structures exist where the alignment is "addend-anchored". The principles described here also apply to them.

What is claimed is:

1. A method of fused calculation of the sum of an addend and a product of two multiplication operands using a floating-point unit of a proccessor, the addend and multiplication operands being binary floating-point numbers represented in a standardized format as a mantissa and an exponent, wherein the multiplication operands are in a lower precision format than the addend, with q>2p, where p is the mantissa size of the multiplication operands precision format and q is the mantissa size of the addend precision format, the method comprising the steps of:

multiplying, using a p-bit multiplier, the mantissas of the multiplication operands;

right-padding the 2p-bit product resulting from the multiplication with zeros to form a q-bit product mantissa;

aligning, with a shifter, the mantissa of the addend and the mantissa of the product based on the exponent values of the addend and multiplication operands; and adding with an adder, the aligned mantissas of the product and the addend.

2. The method of claim 1, comprising the steps of:

left-shifting the addend mantissa and the product based on the number of leading zeros in the multiplication operands mantissas; and decreasing the exponent of the final result by the left-shift amount.

3. A circuit for calculating the fused sum of an addend and a product of two multiplication operands, the addend and multiplication operands being binary floating-point numbers represented in a standardized format as a mantissa and an exponent, wherein the multiplication operands are in a lower precision format than the addend, with q>2p, where p is the mantissa size of the multiplication operands precision format and q is the mantissa size of the addend precision format, comprising:

a p-bit multiplier receiving the mantissas of the multiplication operands;

a shift circuit configured to align the mantissa of the addend with the product output by the multiplier based on the exponent values of the addend and multiplication operands; and an adder configured for processing q-bit mantissas, receiving the aligned mantissa of the addend and the product, the input lines of the adder corresponding to the product being completed to the right by lines at 0 to form a q-bit mantissa.

4. The circuit according to claim 3, comprising:

a zero counter circuit providing the sum of the number of leading zeros of the mantissas of the multiplication operands;

a left-shift circuit connected to act on the output of the multiplier, receiving the output of the zero counter circuit as the shift amount; and a right-shift circuit connected to act on the mantissa of the addend, receiving as a shift amount a function of the exponents of the addend and multiplication operands, less the output of the zero counter circuit.

5. The circuit according to claim 4, wherein the size of the inputs of the adder is 2q bits, plus a few bits for accommodating carry propagation and rounding bits.

\* \* \* \* \*